United States Patent [19]
Ko et al.

[11] 3,828,237

[45] Aug. 6, 1974

[54] FUEL-AIR RATIO CONTROLLER

[75] Inventors: Wen H. Ko, Cleveland Heights; James R. Knodel, Parma; Chih Piao Hung, Berea, all of Ohio

[73] Assignee: North American Manufacturing Company, Cleveland, Ohio

[22] Filed: July 11, 1973

[21] Appl. No.: 378,249

Related U.S. Application Data

[63] Continuation-in-part of Ser. No. 354,338, April 25, 1973, abandoned.

[52] U.S. Cl. ............... 318/619, 318/561, 318/675
[51] Int. Cl. ......................................... G05b 11/01
[58] Field of Search ........... 318/560, 561, 619, 625, 318/663, 675

[56] References Cited
UNITED STATES PATENTS

| | | | |
|---|---|---|---|
| 3,605,000 | 9/1971 | Inaba et al. | 318/619 |
| 3,611,100 | 10/1971 | McQuown, Jr. | 318/561 |
| 3,644,720 | 2/1972 | Falk | 318/619 X |
| 3,644,816 | 2/1972 | Gilbert | 318/675 X |

*Primary Examiner*—Robert K. Schaefer
*Assistant Examiner*—W. E. Duncanson, Jr.
*Attorney, Agent, or Firm*—Meyer Tilberry & Body

[57] ABSTRACT

An electronic valve characterizer for fuel-air ratio control wherein the primary valve may be arbitrarily set and the secondary valve or valves are actuated by a slave motor or motors to a predetermined ratio of fuel to air for any setting of the primary valve. The primary and secondary valves are each controlled by motor-actuated valves, each having a slide wire and a slide. The secondary slide is set to operate at a speed in excess of the primary slide. The signal from the primary slide is passed through an amplifier having adjustable rates of amplification in each of a series of adjustable sectors of the movement of the primary slide. The amplified signal is compared with an amplified secondary slide signal and the secondary motor energize to bring the amplified secondary slide signal into general equality with the amplified primary slide signal.

10 Claims, 6 Drawing Figures

FUEL-AIR RATIO CONTROLLER

This application is a continuation-in-part of our abandoned application Ser. No. 354,338, filed Apr. 25, 1973.

This invention pertains to the art of controls for the combustion of fuel and more particularly to controls which enable a predetermined ratio of fuel to air to be automatically obtained for any settings of the air valve.

In the combustion of fuels, the ratio of fuel to air must be carefully controlled if complete and efficient combustion is to be obtained for all fuel rates.

Heretofore, the positioning of the fuel valve relative to the air valve has been accomplished by mechanically linking the valves and driving them with a single operator, e.g. a motor. However, the problem has been that the flow percentage vs. opening curves of the air and fuel valves rarely match so that as the air valve is adjusted the ratio of air to fuel departs from the desired optimum ratio at various points of the adjustment.

It has been proposed in the past to meter both the air flow and the fuel flow electronically, compare the ratio of the two flows and adjust the fuel valve so that the two flows are always within the desired ratio. Such apparatus is complex and expensive.

The present invention contemplates an improved control which overcomes all of the above difficulties and others and provides a control where for any setting of the air valve the fuel valve will be automatically adjusted to a predetermined corresponding opening to provide the optimum fuel-air ratio. Of course, the invention has broader applications and can be used in various servo systems of valve or flow matching.

In accordance with the invention, the air and fuel valves each have a means for generating an electrical signal proportional to the percentage of opening. As the primary signal, also referred to as "air signal" when used in an air-fuel system changes with adjustment of the primary valve, the air signal is passed through an amplifier with a rate of amplification which can be preset to different values as the signal changes from minimum to maximum or vice versa. This amplified signal is compared with an amplified secondary valve signal, or "fuel signal" in an air-fuel system. The difference in the two signals is used to energize an electric motor to bring the secondary valve signal into equality with the amplified primary valve signal. In effect, the secondary valve signal is amplified on a linear basis while the air valve signal is amplified on a non-linear basis (or vice versa) such that for different percentages of full opening (or closing) of the primary valve, the percentage of full opening (or closing) of the fuel supply valve will differ by predetermined amounts.

Preferably the two valves are each actuated by separate electrical motors, one of the motors being a master for the controlling signal (air) and the other being a slave motor. It is desirable to have the slave motor capable of moving at a greater rate than that of the master motor. Further, the signal generating means can be potentiometers, (or any other position transducers) one associated with each valve having a voltage difference between its terminals and a slide mechanically connected to the respective valve actuator. The same principle applies to a primary and several secondaries, such as gas, oil, etc., which allows the control to be used for dual-fuel operation.

The principal object of the invention is the provision of a new and improved electronic valve characterizing system for fuel-air ratio control, which is relatively inexpensive but which gives the operator substantially full control of the ratio fuel to air for all settings of the air supply valve.

Another object of the invention is the provision of an arrangement for controlling the fuel-air ratio where the fuel valve may be located remote from the air valve.

Another object of the invention is the provision of a new and improved control for air-fuel valves using a motor driven air valve and a slave motor driven fuel valve wherein the desired angular position of the fuel valve may be predetermined relative to the air control motor over its entire range.

Another object of the invention is the provision of a new and improved fuel-air ratio controller wherein the rate of change of the fuel valve relative to the rate of change of the air valve can be varied in an increasing or decreasing amount in each of a plurality of sectors of movement of the valves, whereby the fuel valve position can be matched in any desired ratio to the air valve position in each of these sectors.

Another object of the invention is the provision of a new and improved fuel-air ratio controller wherein the shape of the fuel-valve flow characteristics may be adjusted relative to the air-valve flow characteristics so that the two may be made to closely match and provide optimum air fuel ratios to save fuel and minimize pollution.

Another object of the invention is the provision of a new and improved fuel-air ratio controller which can be used either for excess air operation or a combination of excess air and on ratio firing.

Another object of the invention is the provision of a new and improved fuel-air ratio controller wherein adjustment over the entire operating range can be simply effected by turning a single knob.

The invention may take physical form in certain parts and arrangements of parts, a preferred embodiment of which will be described in the specification hereinafter and illustrated in the accompanying drawings which form a part hereof and wherein:

Figure 1:
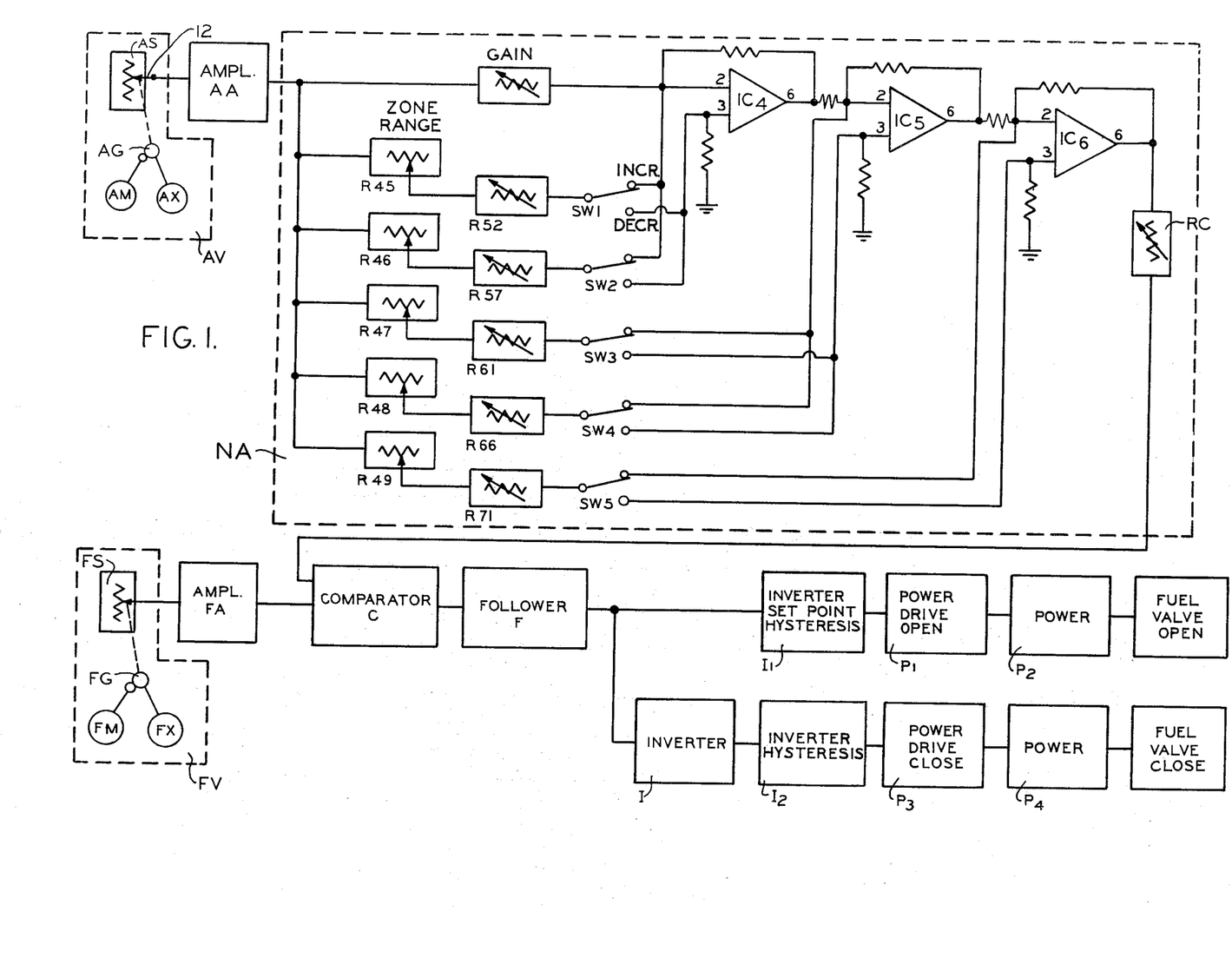
FIG. 1 is a block diagram illustrating somewhat schematically a preferred embodiment of the invention.

Referring now to the drawings wherein the showings are for the purpose of illustrating a preferred embodiment of the invention only and not for the purposes of limiting same, FIG. 1 shows in block form an air-fuel control arrangement embodying the present invention comprised generally of a primary or air valve AV, and a secondary or fuel valve FV, each valve having a motor AM & FM respectively for opening and closing it, and means AS, FS for generating an electrical signal proportional to the valve position.

The electrical control circuit comprises a generally linear amplifier FA for the secondary or fuel valve signal, a linear amplifier AA followed by an adjustably nonlinear amplifier NA for the primary or air valve signal, a comparator C for the two amplified signals, a follower amplifier F, positive signals from which actuate a first inverter $I_1$ having a set point hysteresis characteristic which in turn controls a power control circuits $P_1$, $P_2$ which energizes the secondary valve motor FM to open the secondary valve FV. Negative signals from the follower F actuate an inverter I and in turn a second invertor $I_2$ with a set point hysteresis characteristic which in turn controls power control circuits $P_3$, $P_4$ to energize the secondary valve motor FM to cause the secondary valve FV to close. A ratio control RC between the output of the nonlinear amplifier NA and the comparator C enables the ratio of the percentage opening of the secondary valve to the primary valve to be adjusted as desired. The primary valve ordinarily controls air flow and the secondary valve ordinarily controls fuel either liquid or gaseous and will hereinafter be referred to as air and fuel valves.

The fuel valve and air valve motors FM, AM may be as desired, but in the preferred embodiment, standard reversible electric gear motors are employed such as a Honeywell M640A Valve Control Motor. The control motors each include a 1,000 ohm slidewire R10, R11 and a slidearm 12, 13 respectively which arms move proportionately with the valve shaft FX, AX. Such slidewires R10, R11 and slides 12, 13 constitute the means for generating signals FS, AS proportional to the position of the respective valve shaft. Preferably, the two motors FM, AM are similar, the only difference being in accordance with the invention, that the ratio of the gearing FG between the fuel or slave motor and its valve shaft FX is slightly lower than between the air or master motor AM and its valve shaft AX. With this arrangement, if both motors are identically energized to open or close the two valves, the fuel or slave valve will be closed at a rate in excess of the rate of opening or closing of the air or master valve for reasons which will appear hereinafter.

In general, and as is conventional, the fuel valve motor FM is a slave motor, the circuitry functioning to: amplify the signals from both signal-generating means FS, AS; compare them; and, energize the slave motor so as to bring the signal from the fuel valve signal FS into a predetermined ratio with the air valve signal AS. The principal difference between this prior art and that of the present invention is that the amplifying means for the fuel or slave valve signal has a generally linear amplification curve while the amplifying means for the air or master valve signal has an amplification curve which can be adjusted to any degree of nonlinearity. This is done in the preferred embodiment by dividing up its range of input signals into a plurality of sectors of adjustable width and then providing for the amplification factor in each sector to be individually adjusted. Thus, within each sector, the amplification may be linear, but the composite amplification over the entire range of input signals will be nonlinear.

The number of sectors in the amplifying range may be as desired in excess of one depending upon how closely the slave motor must follow the master motor, but in the preferred embodiment there are six sectors.

It is believed that the electronic circuitry with the exception of the nonlinear amplifier for the air valve signal is relatively conventional and well known to those skilled in the art and accordingly only the nonlinear amplifier itself will be described in great detail.

Figure 2:
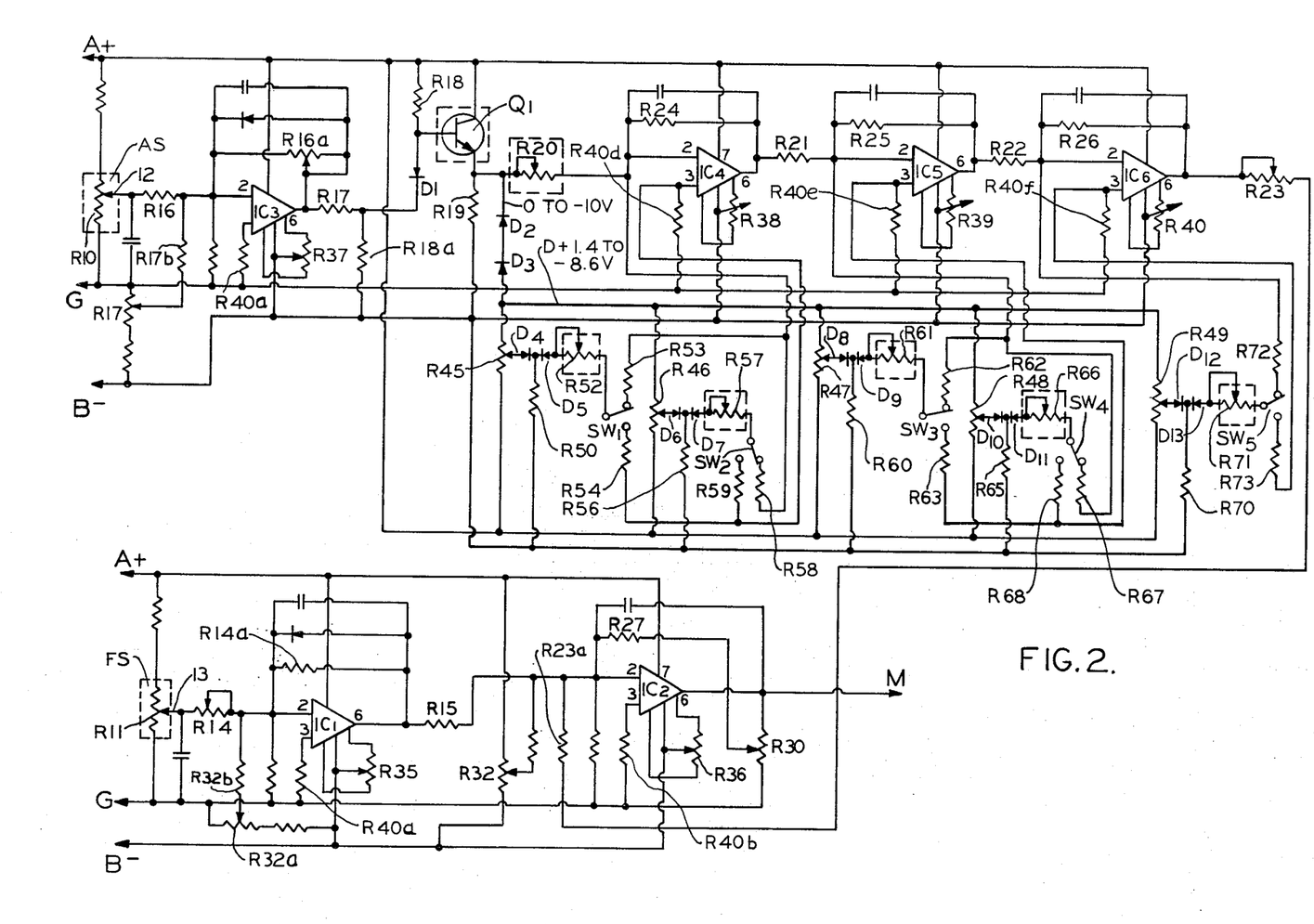
FIGS. 2, 3 and 4 are detailed schematic diagrams of a preferred circuit.

Thus, in the embodiment shown in FIG. 2, the amplifiers are energized from power supply buses A and B, positive and negative relative to a common ground G. The air valve and fuel valve slide wires R10, R11 are energized between the positive and common ground A and G.

The signal from fuel valve slide arm 13 feeds through variable resistor R14 to terminal 2 of $IC_1$. The output of $IC_1$ in turn feeds from terminal 6 to terminal 2 of $IC_2$ through resistor R15. Terminal 2 of $IC_1$ connects through resistor R32b to the slide of potentiometer R32a connected between buses B, G. The position of ths slide adjusts the bias on $IC_1$ so that at the initial position of slide 13 on R11, the output of $IC_1$ is zero. The gain of $IC_1$ is limited by R14a connected between terminals 6 and 2.

In a like manner, the signal from air valve slide arm 12 feeds through resistor R16 to terminal 2 of $IC_3$. The output of $IC_3$ feeds from terminal 6 through R17 and diode $D_1$ to the base of transistor $Q_1$. Terminal 2 connects through R17b to the slide of potentiometer R17a connected between buses B, G. The position of the slide adjusts the bias on terminal 2 of $IC_3$ so that at the initial position of slide 13 on R11 the output of $IC_3$ is zero. The gain of $IC_3$ is limited by adjusting variable resistor 16a connected from terminal 6 to terminal 2. The bias on the base of $Q_1$ is determined by resistor R18 connected between buss A and the base of $Q_1$. Diode $D_1$ compensates for voltage drop between the emitter and base of $Q_1$. The output signal $Q_1$ appears across R19 and feeds through variable resistor R20 to terminal 2 of $IC_4$. The output signal of $IC_4$ feeds from terminal 6 through resistor 21 to input terminal 2 of $IC_5$. The output of $IC_5$ feeds from terminal 6 through resistor R22 to terminal 2 of $IC_6$. The output of $IC_6$ feeds from terminal 6 through variable resistor R23 and resistor R23a to terminal 2 of $IC_2$.

The gain of $IC_4$, $IC_5$, $IC_6$ is limited by resistors R24, R25, R26, connecting between terminals 6 and 2 of the respective IC's. The gain of $IC_2$ is limited by the feedback to terminal 2 through R27 connecting to the arm of potentiometer R30. R30 connects from terminal 6 to bus G.

Potentiometer R35, R36, R37, R38, R39 and R40 connect across terminals 1 and 5 of $IC_1$, 2, 3, 4, 5, and 6 respectively while the slide arm connects to terminal 4 and bus B to provide a balance offset adjustment for each IC.

Terminals 3 of $IC_1$, 2, 3, 4, 5 and 6 connect to bus G through resistors R40a, R40b, R40c, R40d, R40e, R40f respectively to bias the IC's.

As above described, the amplifiers for the fuel signal FS and the air signal AS will each have a linear amplification curve, with the same amplification for each signal. $IC_1$ amplifies the fuel valve signal FS and feeds it to terminal 2 of $IC_2$. $IC_3$, $Q_1$, $IC_4$, $IC_5$ and $IC_6$ amplify the air valve signal AS and feed it to terminal 2 of $IC_2$. These amplifiers are so adjusted that at the initial ground adjacent position of slides 12, 13 the outputs are zero.

$IC_2$ is so biased that its output is zero. As the slides 12, 13 move toward the positive buss A, $IC_1$ feeds a negative going signal to $IC_2$ while $IC_6$ feeds a positive going signal thereto. As long as these two signals are equal the output of $IC_2$ is zero. If the two input signals differ, the output of $IC_2$ will be amplified proportional to that difference with an opposite polarity. $IC_2$ functions as a comparator.

In accordance with the invention, the total amplifier $IC_4$, $IC_5$, $IC_6$ for the air signal AS can have its amplification for any given level of input signal different from the amplification for any other level of input signal. To do this the output signal of transistor $Q_1$ also feeds through a pair of series polarity diodes $D_2$, $D_3$ to an intermediate signal buss D. Potentiometers R45, R46, R47, R48 and R49 connect between signal buss D to power buss A. The voltage on this buss D varies between $-8.6$ to $+1.4$ volts. $Q_1$ is an emitter follower.

The portion of the signal on the slide arm of potentiometer R45 feeds to diode $D_4$ and when diode $D_4$ conducts, appears across resistor R50 connected to the negative buss B. This signal then feeds through reverse polarity diode $D_5$, variable resistor R52 to the input terminal of switch SW1. Switch SW1 has two poles, one connecting through resistor R53 to terminal 2 of $IC_4$ in which case the portion of the signal picked off potentiometer R45 adds to the signal through resistor R20. With the switch SW2 in the other position, the signal feeds through resistor R54 to terminal 3 of $IC_4$, which in turn connects to the ground buss G through resistor $R40_D$ and thus subtracts from the signal feeding through resistor R20.

Thus, when diodes $D_2$, $D_3$ conduct, a voltage or signal appears on intermediate signal buss D as input voltage and the voltage on buss D goes from $+1.4$ volts to $-8.6$ volts as slide arm 12 is moved toward buss A. If the signal is zero or small, the voltage on buss D is small and the voltage on slide of R45 is greater than $+0.60$ volts, then the junction of $D_4$ and $D_5$ is positive. $D_5$ presents an open circuit and there is no input to R52 and the output of $IC_4$ is controlled only by the input through R20.

As the input voltage to $IC_3$ increases in magnitude and thus the voltage on buss D goes negative, the voltage on the slide of R45 decreases from plus to minus. When this voltage decreases to less than zero and the junction of $D_4$ and $D_5$ becomes less than $-0.6$ volts; $D_5$ conducts. The voltage at the input terminal of R52 equals that on the slide of R45. The output of $IC_4$ is then controlled by the input through R20 and R52. The setting of R45 determines the breakover point. When diode $D_5$ conducts the signal feeds either to terminal 2 of $IC_4$ or terminal 3 of $IC_4$ depending on the position of switch SW1. When the signal feeds to terminal 3 it subtracts from the signal fed to terminal 2 and the difference appears as amplified output of $IC_4$. The overall gain of $IC_4$ is thus reduced by the setting of R52. When the signal feeds to terminal 2 it adds to the signal fed to terminal 2 from R20 and the sum appears as amplified output of $IC_4$. The overall gain of $IC_4$ is thus increased.

In a similar manner, the portion of the signal on buss D on the slide arm of potentiometer R46 feeds through diode D6 and appears across resistor R56 connected to the negative buss B—. When this voltage becomes negative beyond the breakover voltage set by R46, the diode $D_7$ conducts, the voltage at R46 feeds through variable resistor R57 to switch SW2, and in one position of SW2 to resistor R58 to terminal 2 of $IC_4$; or in the other position of switch SW2 through resistor R59 to terminal 3 of $IC_4$. The setting of R46 determines the breakover point which is usually different from that of R45.

In a similar manner, the portion of the signal on the slide arm of potentiometer R47 is fed through diode $D_8$ and appears across resistor R60 to the negative buss B—. This portion, when it exceeds the breakdown voltage set by R47, causes diode $D_9$ to conduct. The voltage at R47 feeds through to variable resistor R61 and switch SW3, and in one position to resistor R62 to terminal 2 of $IC_5$ or in the other position of switch SW3 through resistor R63 to terminal 3 of $IC_5$.

In a like manner, the portion of the signal on the slide arm of potentiometer R48 is fed through diode $D_{10}$ and appears across resistor R65 connected to the negative buss B—. This portion, when it exceeds the breakdown voltage set by R48, causes $D_{11}$ to conduct. The voltage at R48 feeds through variable resistor R66, switch SW4, and resistor R67 to terminal 2 of $IC_5$, or in the other position of switch SW4 through resistor R68 to terminal 3 of $IC_5$.

In a like manner, the portion of the signal on slide arm of potentiometer R49 feeds through diode $D_{12}$ and appears across resistor R70 to the negative buss B—. This portion, when it exceeds the breakdown voltage set by R49, causes $D_{13}$ to conduct. The voltage at R49 feeds through variable resistor R71, switch SW5 and resistor R72 to terminal 2 of $IC_6$ or in the other position of switch SW5 through resistor R73 to terminal 3 of $IC_6$.

By appropriately adjusting potentiometers R45, R46, R47, R48 and R49 and selecting the position of switches SW1, SW2, SW3, SW4 and SW5, a portion of the output signal of transistor $Q_1$ is fed to $IC_4$, $IC_5$ and $IC_6$ as the diodes $D_4$, $D_5$; or $D_6$, $D_7$; or $D_8$, $D_9$; or $D_{10}$, $D_{11}$; or $D_{12}$, $D_{13}$ respectively become conductive. Depending on the relative positions of the potentiometer slidearms, these pairs of diodes become conductive at different signal levels on buss D. The signals then either subtract or add to the signal being otherwise applied to terminal 2 of $IC_4$, $IC_5$ and $IC_6$ depending on the position of switches SW1, SW2, SW3, SW4 and SW5. The amplification of these signals in $IC_4$, $IC_5$ and $IC_6$ is controlled by adjusting the resistance of variable resistors R52, R57, R61, R66 and R71 relative to the resistance of: R24, R25, and R26 respectively. The result is that at a series of selectable input signal levels or sectors as determined by the position of the potentiometers R45, R46, R47, R48, R49, the gain or amplification can be changed either up or down by the switches SW1, SW2, SW3, SW4, SW5 and the amount of up or the amount of down in each sector can then be adjusted by variable resistors R52, R57, R61, R66 and R71.

Potentiometer $R17_a$ and $R32_a$ as heretofore indicated adjusts the bias on $IC_3$ and $IC_1$ respectively such that when the slide arms 12 and 13 are in the initial position (e.g. at G) at minimum (or maximum) the signal at terminal 6 will be zero. R32 adjusts the bias on $IC_2$ so that when the voltage on terminal 2 is zero, the voltage on terminal 6 is zero. As the air valve AV is open or closed, slide arm 12 moves across resistor R10 and the voltage is amplified through $IC_3$, $Q_1$, $IC_4$, $IC_5$ and $IC_6$ and appears as a positive voltage on terminal 2 of $IC_2$. As the fuel valve FV is opened or closed, slide arm 13 moves across resistor R11, and the voltage is amplified by $IC_1$ and appears as a negative voltage on terminal 2 of $IC_2$. The two voltages add and if the sum is positive, it is amplified in $IC_2$ and appears as a negative voltage at terminal 6. If it is negative, it appears as an amplified positive voltage at terminal 6. $IC_2$ thus compares the amplified fuel and air valve signals FS and AS and gives a negative or positive going signal depending on the difference. Because of the nonlinearlity of the amplifier for the air signal AS, it does not necessarily follow that the two valves will always have the same percentage of opening for equal but opposite signals from the two amplifiers.

The remainder of the circuitry for responding to the negative or positive output of $IC_2$ is within the prior art and is described briefly only for the sake of completeness.

The output signal at terminal 6 of $IC_2$ feeds through points M,M and resistor R80 (see FIG. 3) to terminal 2 of $IC_7$. Terminal 12 of $IC_7$ is connected directly to terminal 1 such that $IC_7$ has unit gain. The output signal from terminal 12 of $IC_7$ is fed both to: terminal 7 of $IC_8$ through resistor R81; and, through resistor R82 to terminal 1 of $IC_9$. $IC_8$ is set by potentiometer R106 so as to only respond to positive going signals. R106 sets the trigger point of the positive incoming signal and R83 sets the hysteresis loop to hold the input trigger signal.

Figure 3:
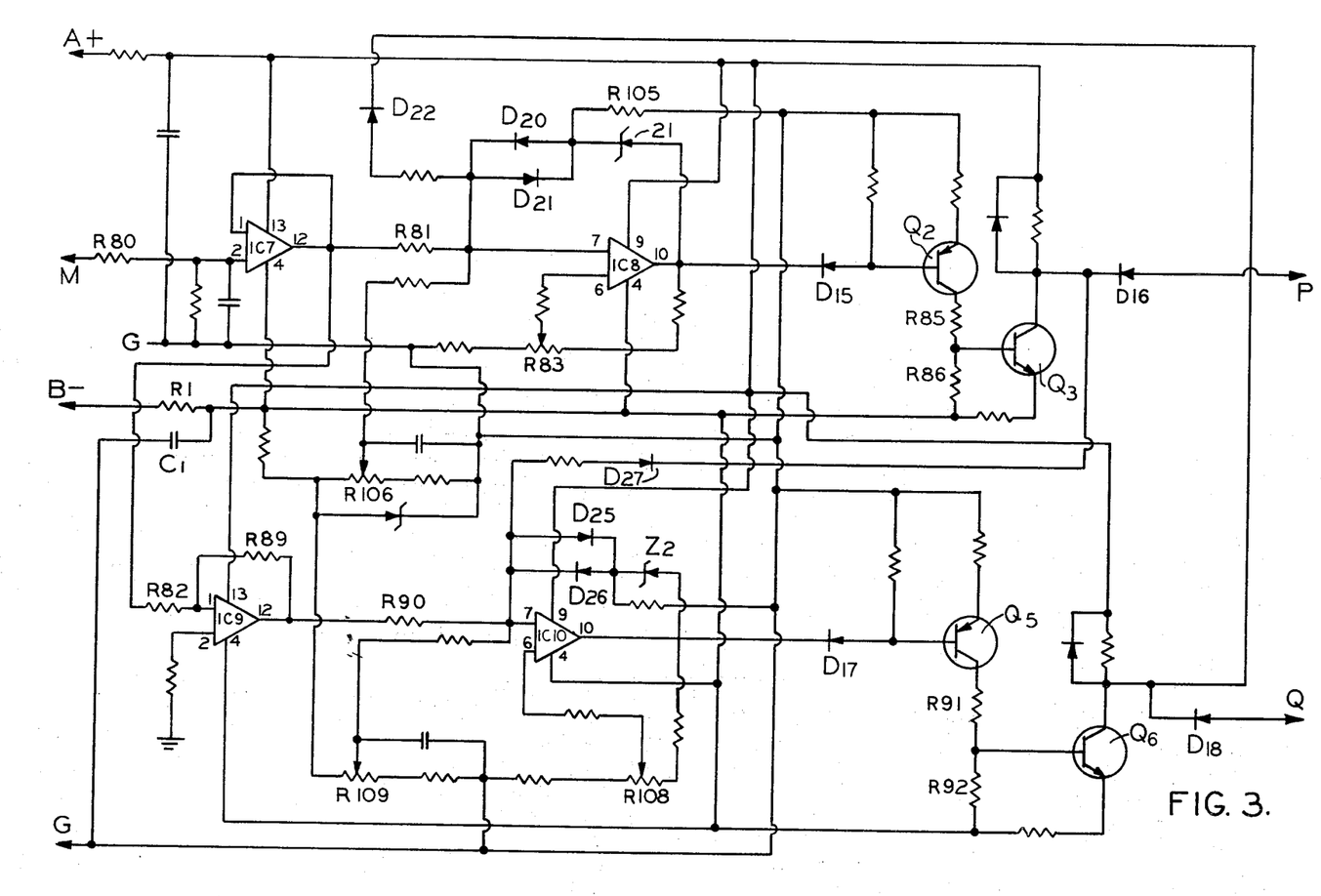

Thus, if the signal on terminal 12 of $IC_7$ is positive, whose magnitude is large enough to overcome the set point voltage at R106, a negative signal appears at terminal 10 of $IC_8$ due to the inversion of amp $IC_8$. This negative signal feeds through diode $D_{15}$ which makes $D_{15}$ conduct. The negative voltage at terminal 10 of $IC_8$ is negative −5 volt when terminal 7 of $IC_8$ is positive; otherwise terminal 10 of $IC_8$ will be positive 1.3 volts when terminal 7 of $IC_8$ is negative. The function of $IC_8$ is a flip flop. The output voltage level is set by the feedback components $D_{20}$, $D_{21}$ and R105, R83. The negative voltage feeds through diode $D_{15}$ to the base of transistor $Q_2$ and makes $Q_2$ conduct. The output signal on the collector of transistor $Q_2$ develops across series resistor R85 and R86 to buss B− through a filter R1, C1. The portion of the signal between resistor R85 and R86 feeds the output signal to transistor $Q_3$, which feeds through diode $D_{16}$, point P-P, (see FIG. 4) the light emitting diode $LD_1$ of a photocoupler $P_1$ and resistor R87 to the ground buss G.

Figure 4:
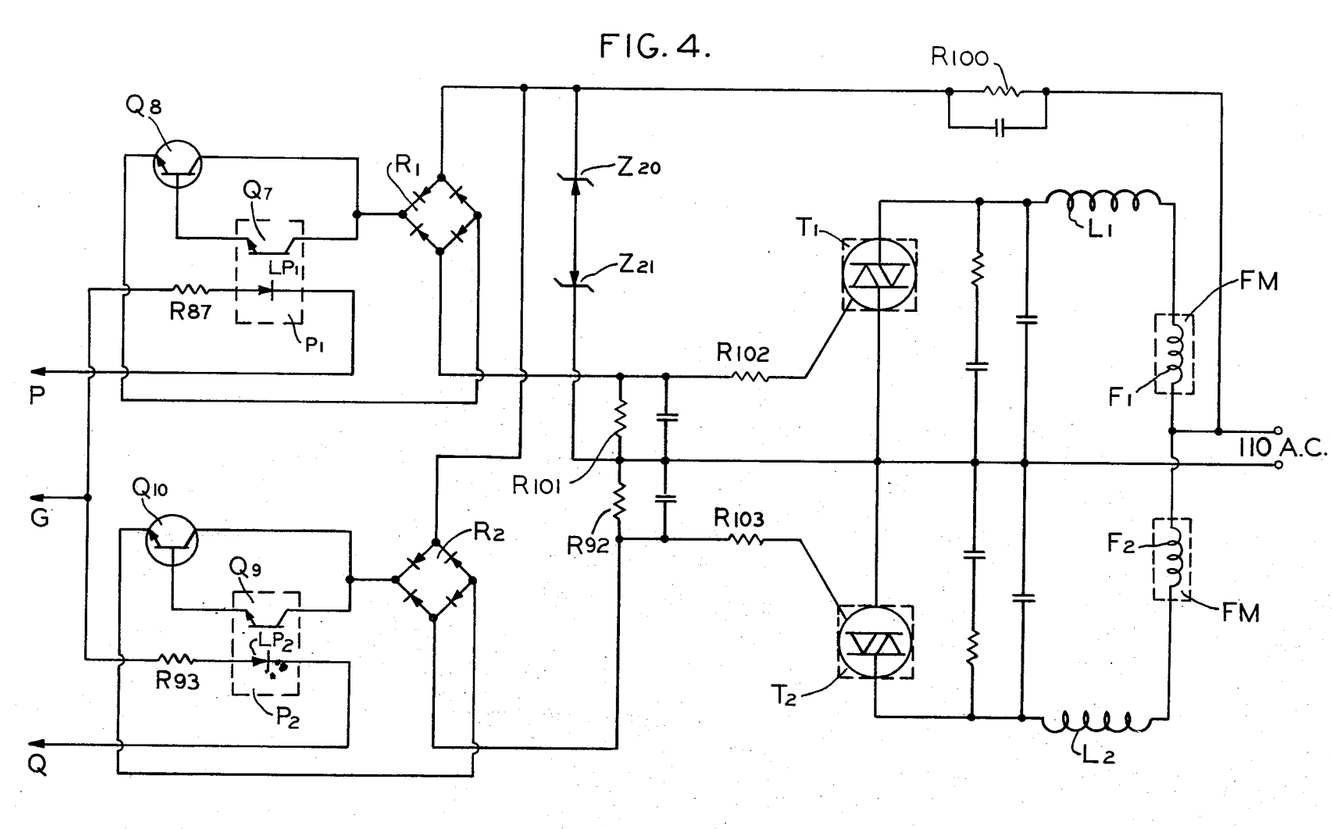

When the light emitting diode (LED) $LD_1$ is conducting, the photocoupler $Q_7$ also conducts, which in turn turns on the transistor $Q_8$, and bridge rectifier R1. Thus, a current will flow from the AC terminals of the bridge rectifier R1 through resistor R100 and R101 placing a voltage to the gate of triac $T_1$ and turns it on. When triac $T_1$ conducts, current flows from the 110 volt AC line through a radio frequency interference (RF1) filter to the field coil F1 of fuel valve motor FM to energize the fuel valve motor in a direction to move the fuel valve armature FA in a direction so as to open the valve FV.

The signal on terminal 12 of $IC_7$ also feeds through resistor R82 to terminal 1 of $IC_9$ the gain of which is limited by R89 connecting from terminal 12 of $IC_9$ to terminal 1. $IC_9$ acts as an inverter, the signal on terminal 12 of $IC_7$ feeding through resistor R90 to terminal 7 of $IC_{10}$. $IC_{10}$ is biased by potentiometer R109 to only respond to negative going signals. Thus, when the signal on terminal 12 of $IC_7$ goes negative, the output of $IC_8$ remains positive 1.3 volts. However, this same signal is inverted and appears as a negative going signal at terminal 10 of $IC_{10}$. This signal feeds through diode $D_{17}$ to the base of transistor $Q_5$ the output of which appears across series resistors R91 and R92 connecting to buss B−. The portion of the signal between resistors R91 and R92 feeds to the base of transistor $Q_6$. The output on the collector of transistor $Q_6$ feeds through diode $D_{18}$, points QQ, (see FIG. 4) light emitting diode $LD_2$ and resistor R93 to ground buss G.

The light emitting diode $LD_2$ is energized, it triggers the transistor portion $Q_9$ of photo-coupler $P_2$ into conduction which in turn triggers transistor $Q_{10}$ into conduction lowering the resistance between the negative and positive terminals of the bridge rectifier R2. Current thus flows from the 110 volt line through resistor R100, the bridge rectifier R2 and the resistor R92 to the other 110 volt AC terminal. This voltage across the resistor R92 appears at the trigger gate of triac $T_2$ to conduct 110 volt power through a small inductance $L_2$ and the field winding $F_2$ of the fuel valve motor FM causing it to rotate in a direction to move the fuel valve armature in a direction to close the fuel valve FV.

In all cases, when the fuel valve motor FM is energized, it operates to move the fuel valve FV in a direction to follow the air valve AV. Because of the difference in the gear ratios between the motors and the valve armatures, the fuel valve armature FX tends to "catch up" with the air valve armature AX at which time the fuel valve motor FM is de-energized.

To prevent the fuel valve motor from hunting, $IC_8$ and $IC_{10}$ are so arranged that the air valve armature AX must be opened a predetermined amount more than the fuel valve armature FX, but once energized it remains so until the fuel valve armature is either at the exact proper ratio or has passed slightly beyond, i.e. it not only catches up but passes slightly beyond the optimum ratio.

The bias of $IC_8$ is adjusted by means of potentiometer R106. By adjusting R106, the point at which $IC_8$ conducts and a voltage appears at terminal 10 can be adjusted. Potentiometer R83 in conjunction with Zener Diode Z1 and diodes $D_{20}$, $D_{21}$ connected with a reverse polarity back to terminal 7 create a hysteresis loop such that when $IC_8$ commences to conduct when the voltage at terminal 7 rises above a predetermined value as set by resistor R106, it will continue to conduct even though the voltage on terminal 2 drops below the voltage of conduction set by R106.

The output of transistor $Q_6$ feeds through diode $D_{22}$ to terminal 7 of $IC_8$ such that when a voltage output appears on $Q_6$, $IC_8$ cannot conduct.

In a like manner, potentiometer R108 connected to terminal 6 of $IC_{10}$ determines when $IC_{10}$ will conduct and Zener Diode Z2 connected from terminal 6 through opposite polarity paralleled diodes $D_{25}$, $D_{26}$ back to terminal 7 determines the hysteresis loop and prevents $IC_{10}$, once it has commenced to conduct, from ceasing conduction until the voltage at terminal 2 of $IC_7$ drops below a predetermined value. The output of transistor $Q_3$ is fed through diode $D_{27}$ to terminal 7 of $IC_{10}$ to prevent $IC_{10}$ from conducting whenever there is output from $Q_3$.

The following solid state items are employed in the preferred embodiment:

| ITEM | TYPE | MANUFACTURER |
|---|---|---|
| IC1, 2, 3, 4, 5 and 6 | U5B7741393 | Fairchild |
| Q1 | 2N1479 | |
| Q2, Q5 | 2N6015 | |
| Q3, Q6, Q8, Q10 | 2N6014 | General Electric |
| P1, P2 | MCT2 | Monsanto |
| T1, T2 | 40430 | RCA |

Figure 5:
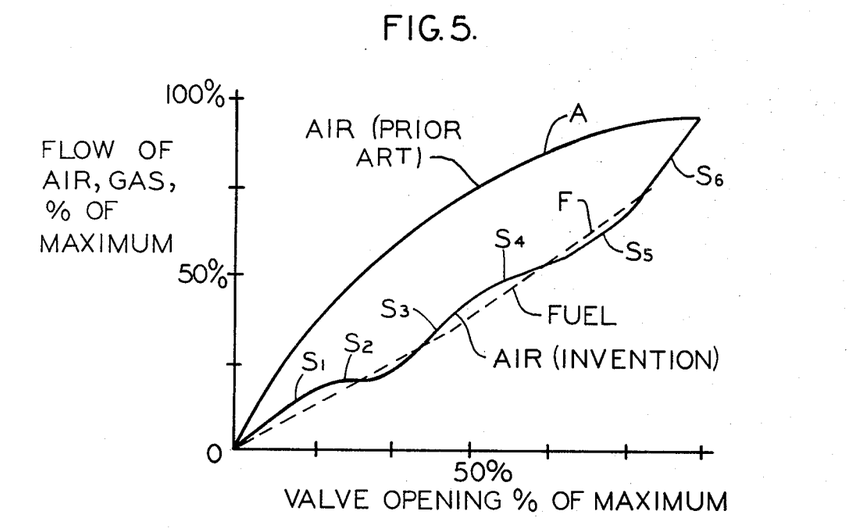
FIG. 5 is curves of the valve flow plotted as a percentage of the valve opening showing the prior art and the invention; and, FIG. 6 is a schematic block diagram showing a modification of the preferred embodiment.

FIG. 5 shows typical curves without using the invention. Dashed curve F shows the flow of fuel as a percent of valve opening. Curve A shows the flow of air as a percent of valve opening. When the curves coincide, the ratio of air to fuel is at the optimum. It will be noted that the curves substantially diverge. It is of course possible to shift the curves such that the optimum ratios occur at points on the curves other than at zero and maximum as shown.

In accordance with the invention, the signal from the air valve is broken into six sectors, S1, S2, S3, S4 and the signal in each sector is then amplified in different amounts. The fuel valve actually sees the air valve as open or closed a greater percentage than it actually is. By appropriately adjusting the amplification in the differing sectors, the two percents of opening of the two valves can be so interrelated that the fuel to air ratio may be maintained at substantially the optimum throughout the entire range of adjustment of the fuel valve. It is also possible to provide an air valve having a maximum flow greater than the optimum ratio and then maintain such optimum ratio until the fuel valve is fully opened and then go beyond to obtain an excess air flow which is desirable in some situations.

Figure 6:
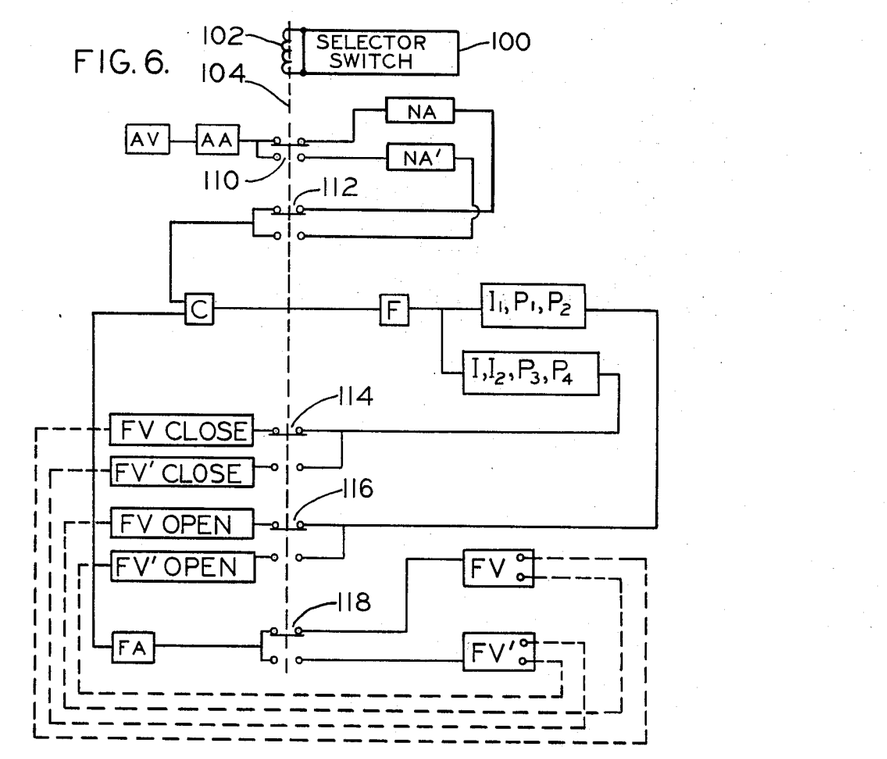

Referring now to FIG. 6, there is illustrated a modification of the preferred embodiment, as previously described. This modification allows the preferred embodiment to be used with a system having more than one fuel supply. For instance, this system could be used when the fuel is to be selected from either of two fuels, such as natural gas or fuel oil. The components for the first fuel correspond to the components illustrated in FIG. 1 and have like alphabetical designations. The components added to the system of FIG. 1 to accommodate a second fuel are essentially identical to like components shown in FIG. 1 and are labeled with prime designations. In other words, the fuel valve for the first fuel is FV, and a substantially identical fuel valve FV' is used for the second fuel. As can be seen in FIG. 6, the system of FIG. 1 has been increased to include a nonlinear amplifier NA', a fuel valve FV', a fuel valve closing circuit for valve FV', a fuel valve opening circuit for valve FV' and a fuel selector 100 having an operating relay coil 102 to control linkage 104 and associated double throw switches 110, 112, 114, 116 and 118 with the fuel selector in the selected position for the first fuel, the double pole switches are in the illustrated positions. Consequently, the system operates as discussed with respect to the preferred embodiment shown in FIG. 1. However, by selecting the second fuel at selector 100, the double pole switches are shifted to the opposite positions. This removes amplifier NA, the FV opening and closing circuits, and fuel valve FV. At the same time, amplifier NA', the FV' opening and closing circuits and fuel valve FV' are inserted into the circuit. In this position a large portion of the previous components are used in a system for controlling a selected second fuel. The operation of the system when in this second selected position is the same as the operation of the system shown in FIG. 1. The selector 100 can also selectively open and close the fuel supply to the two fuel valves FV and FV'. Of course, the switche arrangement could be modified without departing from the schematic teaching of FIG. 6 and more than two fuels could be selectively used. Additional fuel would require addition of further parallel components and appropriate switches for shifting the system into a condition for controlling the additional fuels.

The invention has been described in connection with a preferred embodiment. Obviously, modifications will occur to others upon a reading of this specification and it is our intention to include all such modifications insofar as they come within the scope of the appended claims.

Having thus described our invention, we claim:

1. An apparatus for characterizing primary and secondary valves, each of said valves including an electric motor, a valve armature actuated by said motor and means generating an electric input signal proportional to the position of its respective armature, means for comparing said signals and means powering one of said motors responsive to differences in said signals in a direction to move its armature and bring said signals to equality, the improvement which comprises; first and second separate means for amplifying each of said signals, said first amplifying means having a generally linear amplification curve over the range of its input signal, said second amplifying means having presettable means for varying the linearity of its amplification curve at a plurality of points over the range of its input signal.

2. The improvement of claim 1 wherein said second amplifying means has a series of amplification circuits and a plurality of means each sensitive to a different level of the input signal for independently varying the amplification of each circuit at its sensitivity level.

3. The improvement of claim 1 wherein said second amplifying means includes a plurality of amplifier means for said signal in series each having a predetermined amplification, a plurality of other means each becoming activated at a different input signal level, each of said other means when activated being capable of increasing or decreasing the amplification of one of said amplifier means; and switch means for connecting said other means to one of said plurality of amplifying means whereby the amplification of each of said plurality of amplifying means can be increased or decreased from its predetermined amplification and means for adjusting the amount of increase or decrease.

4. The improvement of claim 1 wherein said secondary valve armature moves at a rate faster than said primary armature when said motors are energized.

5. The improvement of claim 1 wherein said second amplifier means comprises a plurality of amplifiers in series; means feeding said input signal to said amplifiers; means feeding said input signal to an intermediate signal buss through a diode; a plurality of potentiometers connected to said buss, each having a slide arm; a diode in series with an arm and a resistor to ground, a second reverse connected diode connected to said first diode; switch means for selectively connecting said second diode to the same input of said amplifier whereby the amplification thereof is increased or to a differential input to said amplifier whereby the amplification thereof is reduced.

6. The improvement of claim 5 wherein a variable resistor is in series with each output terminal of said switch whereby the amount of increase or decrease can be varied.

7. The improvement of claim 1 wherein said second amplifying means includes a plurality of amplifiers in series, means feeding one of said signals to a first of said amplifiers, means feeding said one signal to a plurality of adjustable signal dividers whereby to provide a plurality of signals proportional to said one signal, and a plurality of means each responsive to one of said proportional signals when it reaches a predetermined level to feed said signal to one of said plurality of amplifiers whereby to change the amplification of the respective one of said plurality of amplifiers.

8. The improvement of claim 1 including a plurality of switch means one between each said signal dividers and the respective one of said plurality of amplifiers, said switch means in one position increasing the amplification of its associated amplifier and in the other position decreasing the amplification of its associated amplifier.

9. The improvement of claim 1 wherein said second amplifying means includes a plurality of IC amplifiers in series, means limiting the amplification of each to a predetermined amount, means feeding said signal to the first of said amplifiers, a plurality of signal dividers in parallel, means changing said signal and feeding it to said signal dividers, including a series diode, a plurality of pairs of reverse polarity diodes in series one between each of said signal dividers and one of said plurality of amplifiers, whereby said divided signal when said series diodes conduct, changes the amplification of its associated amplifier.

10. An apparatus as defined in claim 1, including a second secondary valve including an electric motor, a valve armature actuated by said motor and means for generating an electric input signal proportional to the position of said valve armature of said second secondary valve, a selector means for substituting said second secondary valve for said first-mentioned secondary valve in said apparatus.

* * * * *